(12) United States Patent
Hernandez Esteban (10) Patent No.: US 9,189,891 B2
(45) Date of Patent: Nov. 17, 2015

(54) SYSTEMS AND METHODS FOR NAVIGATING A CAMERA

(75) Inventor: Carlos Hernandez Esteban, Kirkland, WA (US)

(73) Assignee: Google Inc., Mountain View, CA (US)

( * ) Notice: Subject to any disclaimer, the term of this patent is extended or adjusted under 35 U.S.C. 154(b) by 702 days.

(21) Appl. No.: 13/424,313

(22) Filed: Mar. 19, 2012

(65) Prior Publication Data

US 2013/0044139 A1 Feb. 21, 2013

Related U.S. Application Data

(60) Provisional application No. 61/524,305, filed on Aug. 16, 2011.

(51) Int. Cl.
*G09G 5/00* (2006.01)
*G06T 19/00* (2011.01)

(52) U.S. Cl.
CPC .................................. *G06T 19/003* (2013.01)

(58) Field of Classification Search
CPC ...................................................... G06T 19/003
USPC ........................................................ 345/473
See application file for complete search history.

(56) References Cited

U.S. PATENT DOCUMENTS

| | | | |
|---|---|---|---|
| 5,276,785 A | 1/1994 | Mackinlay et al. | |
| 5,613,048 A * | 3/1997 | Shen et al. | 345/419 |
| 8,026,929 B2 | 9/2011 | Naimark | |
| 2003/0063816 A1* | 4/2003 | Chen et al. | 382/284 |
| 2004/0085335 A1* | 5/2004 | Burlnyk et al. | 345/716 |
| 2006/0007312 A1* | 1/2006 | James | 348/169 |
| 2008/0031600 A1* | 2/2008 | Robey | 386/126 |
| 2009/0256837 A1 | 10/2009 | Deb et al. | |
| 2009/0259976 A1* | 10/2009 | Varadhan et al. | 715/850 |
| 2010/0004995 A1 | 1/2010 | Hickman | |
| 2010/0042923 A1 | 2/2010 | Barcay et al. | |

OTHER PUBLICATIONS

Snavely et al., "Photo Tourism: Exploring Photo Collections in 3D", Microsoft Research, Aug. 2006, pp. 835-846, vol. 25, No. 3, retrieved from <http://research.microsoft.com/IVM/PhotoTours>.

* cited by examiner

*Primary Examiner* — Mark Zimmerman
*Assistant Examiner* — Sohum Kaji
(74) *Attorney, Agent, or Firm* — Lerner, David, Littenberg, Krumholz & Mentlik, LLP (57) ABSTRACT

Systems and methods for navigating a camera are provided. In some aspects, a method includes identifying an initial projection of a target on a viewport of the camera. The initial projection is associated with an initial camera pose of the camera. The method also includes determining a final projection of the target on the viewport. The final projection is associated with a final camera pose of the camera. The method also includes calculating intermediate camera poses of the camera along a navigational path between the initial camera pose and the final camera pose. Each of the intermediate camera poses is associated with a corresponding intermediate projection of the target on the viewport. The intermediate camera poses is calculated such that each subsequent one of the intermediate projections is closer to the final projection than is a previous one of the intermediate projections.

29 Claims, 6 Drawing Sheets

SYSTEMS AND METHODS FOR NAVIGATING A CAMERA

CROSS-REFERENCES TO RELATED APPLICATIONS

The present application claims the benefit of U.S. Provisional Patent Application Ser. No. 61/524,305, entitled "Systems and Methods for Navigating a Camera," filed on Aug. 16, 2011, which is hereby incorporated by reference in its entirety for all purposes.

FIELD

The subject technology generally relates to camera navigation and, in particular, relates to systems and methods for navigating a camera in mapping applications.

BACKGROUND

Mapping applications often provide both high-altitude aerial images and low-altitude "streetview" images of points of interest. As a user views a high-altitude aerial image, the mapping application may provide links on a map interface allowing the user to select and view different low-altitude "streetview" images identified by the links. The transition from the high-altitude image to the low-altitude image can be an abrupt and unpleasant user experience.

SUMMARY

According to various aspects of the subject technology, a computer-implemented method for navigating a camera is provided. The method comprises identifying an initial projection of a target on a viewport of the camera. The initial projection is associated with an initial camera pose of the camera. The method also comprises determining a final projection of the target on the viewport. The final projection is associated with a final camera pose of the camera. The final camera pose corresponds to a final camera image at an altitude lower than an altitude of an initial camera image corresponding to the initial camera pose. The method also comprises calculating a plurality of intermediate camera poses of the camera along a navigational path between the initial camera pose and the final camera pose. Each of the plurality of intermediate camera poses is associated with a corresponding intermediate projection of the target on the viewport. The plurality of intermediate camera poses is calculated such that each subsequent one of the plurality of intermediate projections is closer to the final projection than is a previous one of the plurality of intermediate projections.

According to various aspects of the subject technology, a system for navigating a camera is provided. The system comprises a projection module configured to identify an initial projection of a target on a viewport of the camera and to determine a final projection of the target on the viewport. The initial projection is associated with an initial camera pose of the camera. The final projection is associated with the final camera pose. The final camera pose corresponds to a final camera image. The system also comprises a camera pose module configured to calculate a plurality of intermediate camera poses of the camera along a navigational path between the initial camera pose and the final camera pose. Each of the plurality of intermediate camera poses is associated with a corresponding intermediate projection of the target on the viewport. The camera pose module is configured to calculate the plurality of intermediate camera poses such that each subsequent one of the plurality of intermediate projections is closer to the final projection than is a previous one of the plurality of intermediate projections.

According to various aspects of the subject technology, a machine-readable medium encoded with executable instructions for navigating a camera is provided. The instructions comprise code for identifying an initial projection of a target on a viewport of the camera. The initial projection is associated with an initial camera pose of the camera. The initial camera pose corresponds to an aerial image displaying the target. The instructions also comprise code for determining a final camera pose of the camera based on the target. The final camera pose corresponds to a street-level panoramic image displaying the target. The instructions also comprise code for determining a final projection of the target on the viewport. The final projection is associated with the final camera pose of the camera. The instructions also comprise code for calculating a plurality of intermediate camera poses of the camera along a navigational path between the initial camera pose and the final camera pose. Each of the plurality of intermediate camera poses is associated with a corresponding intermediate projection of the target on the viewport. The plurality of intermediate camera poses is calculated such that each subsequent one of the plurality of intermediate projections is closer to the final projection than is a previous one of the plurality of intermediate projections. The plurality of intermediate projections is aligned in a straight line between the initial projection and the final projection.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

According to various aspects of the subject technology, a method is provided for generating a swoop or flying transition from an initial high-altitude image view to a target low-altitude image view in the viewport of a camera in a mapping application. The method may interpolate camera poses along a transition path between the initial high-altitude image view and the target low-altitude image view. The camera poses may be determined subject to one or more constraints. For example, the one or more constraints may include requiring a target's projection on the viewport of the camera to monotonically get closer to a final projection of the target on the viewport during the transition. The constraints also may include maintaining the projection of the target on the viewport on a two-dimensional (2D) line joining an original projection of the target on the viewport to the final projection on the viewport.

Figure 1:
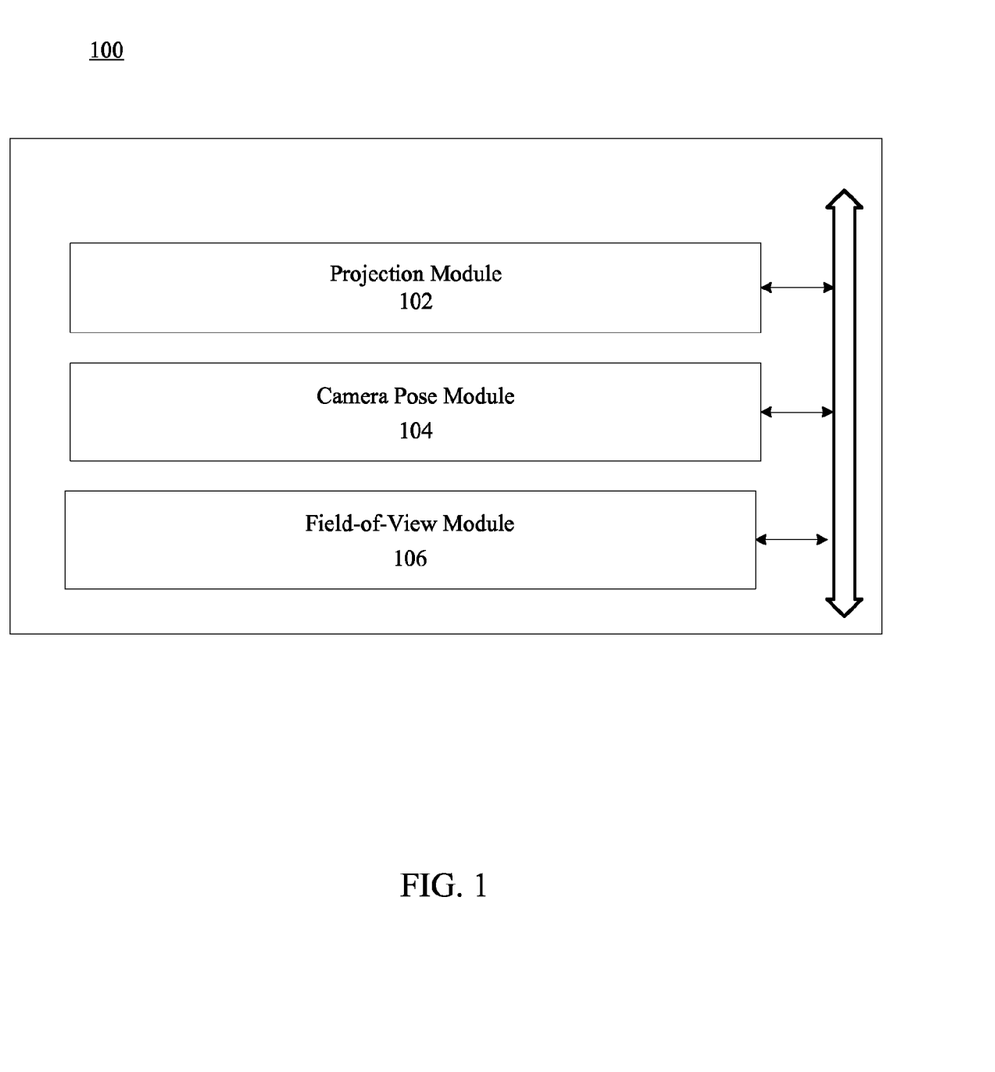
FIG. 1 illustrates an example of a system for navigating a camera, in accordance with various aspects of the subject technology.

FIG. 1 illustrates an example of system 100 for navigating a camera, in accordance with various aspects of the subject technology. System 100 comprises projection module 102, camera pose module 104, and field-of-view (FOV) module 106. These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 2:
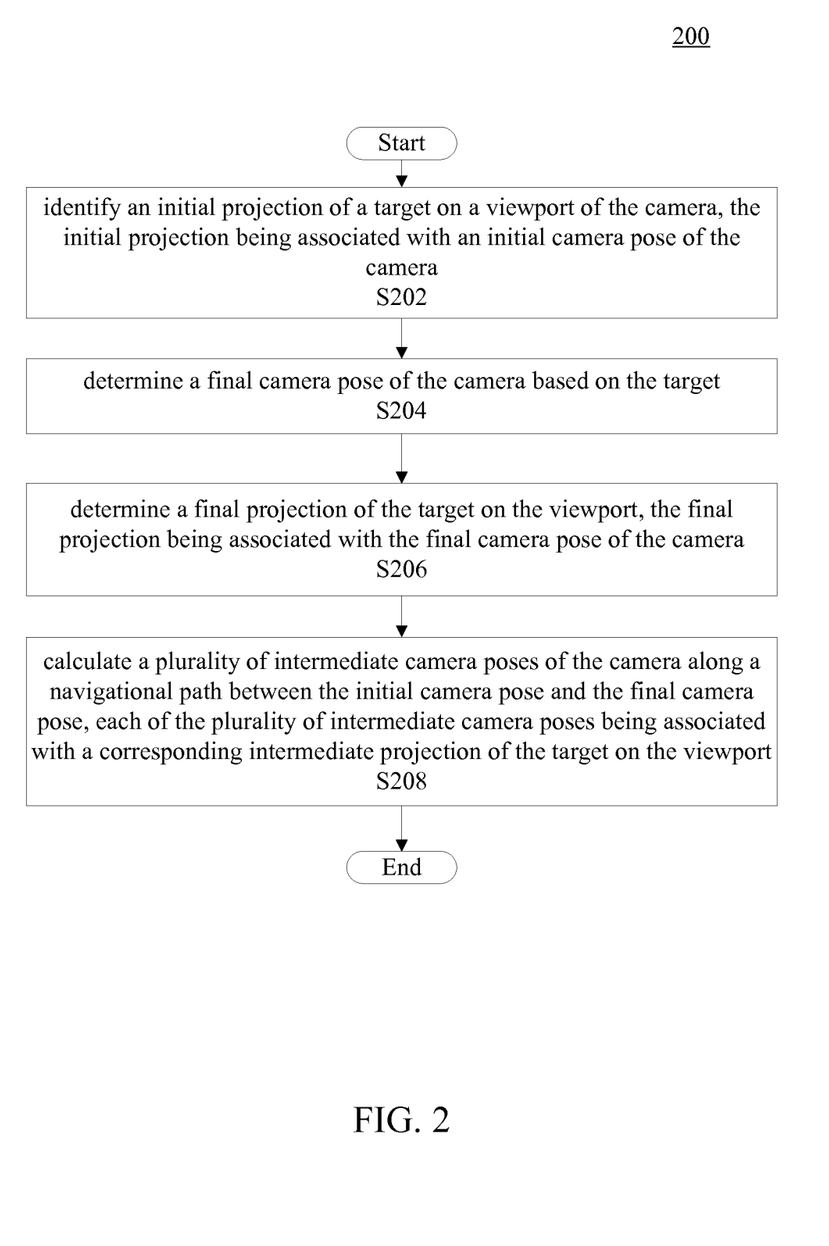
FIG. 2 illustrates an example of a method for navigating a camera, in accordance with various aspects of the subject technology.
Figure 3:
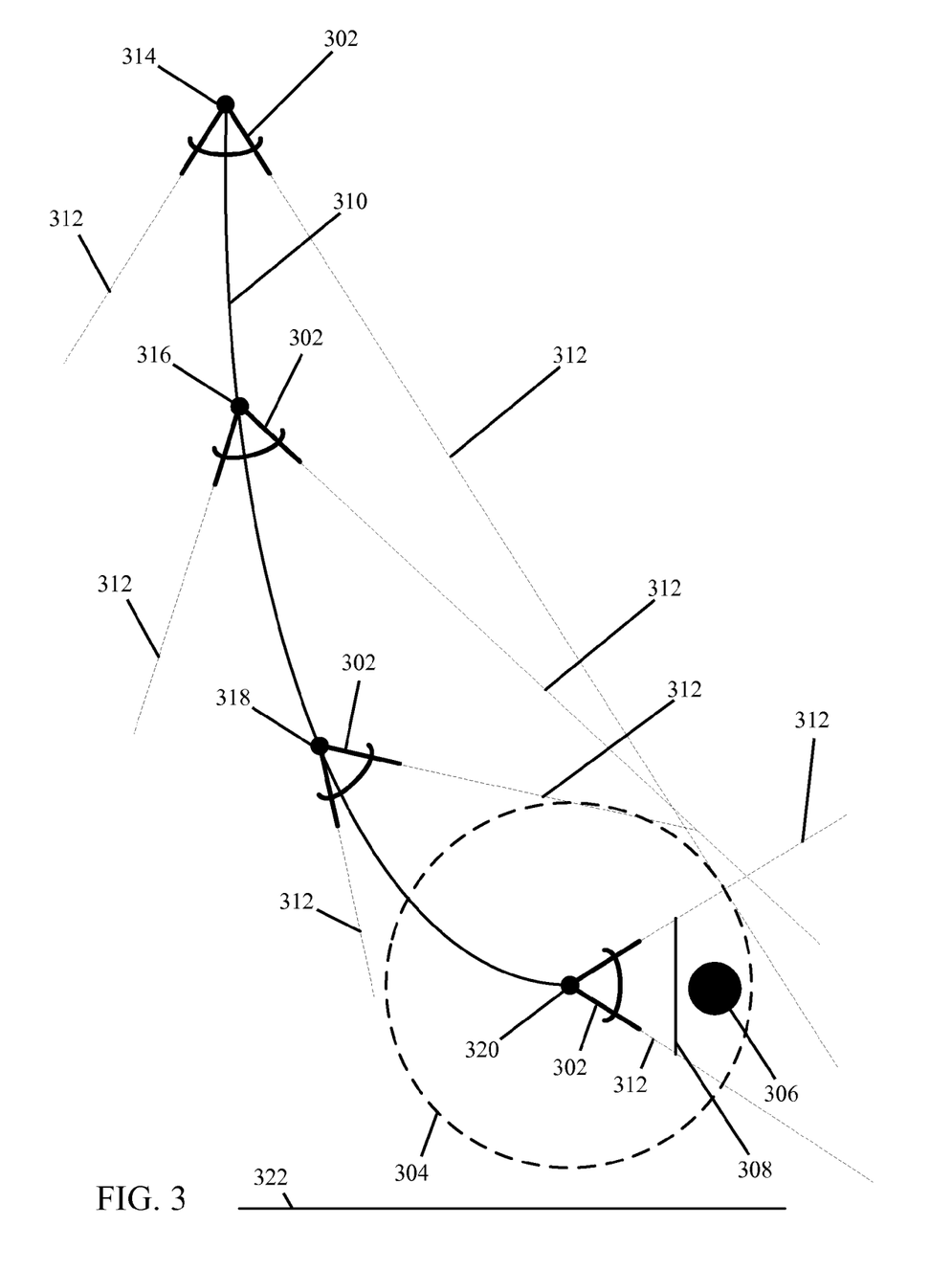
FIG. 3 illustrates an example of a camera swooping along a navigational path from a high-altitude position to a low-altitude position to view a target, in accordance with various aspects of the subject technology.

FIG. 2 illustrates an example of method 200 for navigating a camera, in accordance with various aspects of the subject technology. FIG. 3 illustrates an example of camera 302 swooping along navigational path 310 from a high-altitude position (e.g., at position 314) to a low-altitude position (e.g., at position 320) to view target 306, in accordance with various aspects of the subject technology. Method 200 may be used to calculate a plurality of camera poses of camera 302 between the high-altitude position and the low-altitude position to generate a swooping transition. Target 306 may be a point of interest in a mapping application. For example, target 306 may be a three-dimensional (3D) landmark that a user may view from the high-altitude position. To obtain a closer "streetview" of the 3D landmark, the user can select target 306 from the mapping application to position camera 302 at the low-altitude position. Method 200 may be used to calculate the plurality of camera poses of camera 302 to navigate camera 302 from the high-altitude position to the low-altitude position.

Figure 4:
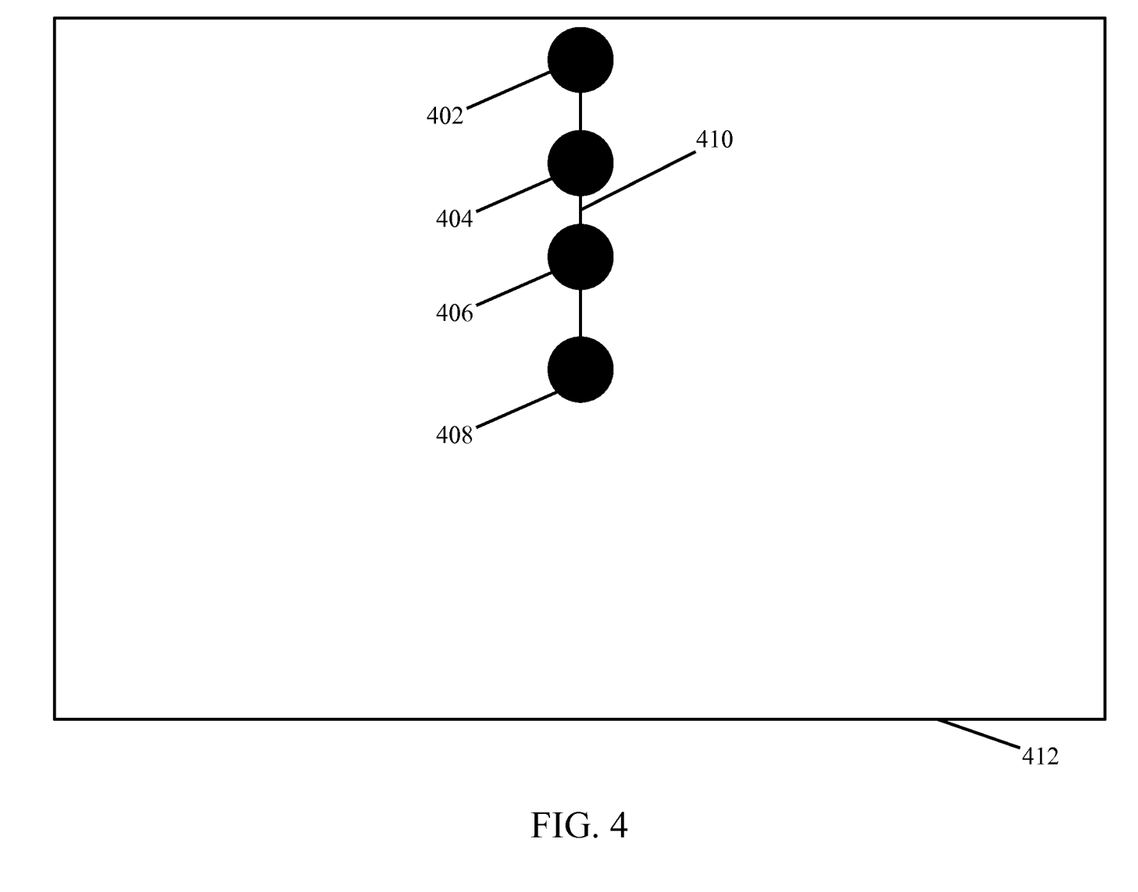
FIG. 4 illustrates an example of multiple projections of a target formed on a viewport of a camera at various stages along a navigational path, in accordance with various aspects of the subject technology.

Returning to FIGS. 1 and 2, projection module 102 may identify an initial projection of target 306 on a viewport of camera 302 according to step S202. FIG. 4 illustrates an example of multiple projections of target 306 formed on viewport 412 of camera 302 at various stages along navigational path 310, in accordance with various aspects of the subject technology. As shown in FIGS. 3 and 4, when camera 302 is at the initial position 314 (e.g., the high-altitude position), target 306 is within field-of-view 312 of camera 302 and forms initial projection 402 on viewport 412. Initial projection 402 is associated with an initial camera pose of camera 302. For example, when camera 302 assumes the initial camera pose, initial projection 402 of target 306 is formed on viewport 412.

The initial camera pose may comprise at least one of the initial position (e.g., position 314) of camera 302 and an initial orientation of the camera. In some aspects, the initial position of camera 302 may be used to determine an initial distance between camera 302 and target 306. The initial orientation of camera 302 may comprise at least one of an initial tilt angle of camera 302 and an initial heading angle of camera 302. For example, as shown in FIG. 3, camera 302 is in the initial camera pose at position 314. In this initial camera pose, camera 302 is tilted zero degrees with respect to a normal to surface 322 of the Earth. Thus, camera 302 in the initial camera pose may provide an overhead view of surface 322, including a top view of target 306.

Returning to FIGS. 1 and 2, according to step S204, camera pose module 104 may determine a final camera pose of camera 302 based on target 306. For example, after the user selects target 306 to be viewed at the low-altitude position, camera pose module 104 may determine the final camera pose needed to view target 306 at the low-altitude position. The final camera pose may comprise at least one of a final position (e.g., the low-altitude position at position 320) of camera 302 and a final orientation of camera 302. For example, as shown in FIG. 3, camera 302 is in the final camera pose at position 320. In this final camera pose, camera 302 is tilted 90 degrees with respect to a normal to surface 322.

According to certain aspects, instead of using a three-dimensional model of an environment around target 306 to provide a streetview of target 306, panorama image 304 may be used. That is, panorama image 304 may be used to provide the streetview of target 306 as well as of the environment around target 306. In some aspects, panorama image 304 may be spherical, and camera 302 may be positioned within a center of panorama image 304, thereby allowing a user to view the environment around target 306 by orienting camera 302 in different directions. Although panorama image 304 is shown as spherical and completely surrounding camera 302, panorama image 304 may also be parabolic or curved in some other suitable manner so that panorama image 304 may fully or partially surround camera 302 to provide the streetview of target 306 and the environment around target 306. In some aspects, camera 302 may be positioned at a center of panorama image 304. The final camera pose can be determined by determining the final position (e.g., centered within panorama image 304 in FIG. 3) and the final orientation to provide the user with the streetview of target 306. According to certain aspects, billboard image 308 may be used to determine the final position and the final orientation of camera 302.

Figure 5:
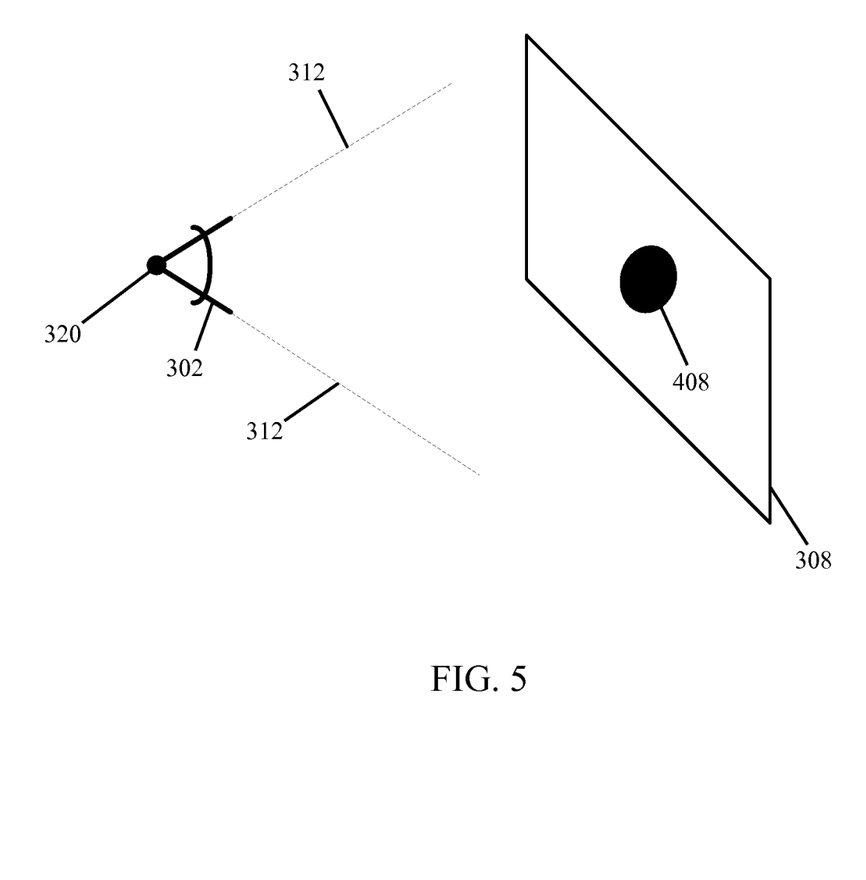
FIG. 5 illustrates an example of a billboard image, in accordance with various aspects of the subject technology.

FIG. 5 illustrates an example of billboard image 308, in accordance with various aspects of the subject technology. Camera pose module 104 may determine the final camera pose of camera 302 by generating billboard image 308. Billboard image 308 may be a two-dimensional (2D) plane perpendicular to a ground plane (e.g., surface 322 in FIG. 3), and may display target 306 in the same manner as if camera 302 were centered at position 320 within panorama image 304 and oriented in the direction of target 306. Billboard image 308 may serve as a destination image for camera 302 to navigate towards to capture the view shown in billboard image 308. Without billboard image 308 serving as the destination image, it may be difficult to determine the final orientation needed to view target 306 within panorama image 304. For example, camera pose module 104 may determine the final position and the final orientation of camera 302 such that viewport 412 of camera 302 is aligned with billboard image 308. Once camera 302 assumes the final camera pose (e.g., at the final position and the final orientation), camera pose module 104 may remove billboard image 308, and the view of target 306 provided by camera 302 would be the same as the view provided by billboard image 308. In some aspects, camera pose module 104 may remove billboard image 308 once camera 302 navigates into panorama image 304.

Billboard image 308 may be defined using various parameters. For example, billboard image 308 may be defined by a viewing position and a viewing orientation. For example, a camera positioned at the viewing position and oriented at the viewing orientation would be able to view billboard image 308. Camera pose module 104 may determine the final position and the final orientation of camera 302 by matching the final position to the viewing position and matching the final orientation to the viewing orientation. Camera 302, as shown in FIG. 3, is positioned at the viewing position and oriented at the viewing orientation, which allows camera 302 to view billboard image 308 (as indicated by field-of-view 312). The viewing position may be defined by a latitude, a longitude, an elevation, and a distance between the viewing position and a center of billboard image 308. The viewing orientation may be defined by a heading (e.g., a direction that a camera may face to view billboard image 308).

Billboard image 308 may also be defined according to another set of parameters. For example, billboard image 308 may be defined by an elevation of a center of the 2D plane of billboard image 308, a heading of a normal to the 2D plane, and a viewing position that a camera may be positioned at to view billboard image 308. This viewing position may be defined by a distance between the viewing position and the center of the 2D plane, a latitude of the viewing position, and a longitude of the viewing position. In some aspects, the latitude of the viewing position may comprise a latitude of the center of the 2D plane subtracted by the distance along the heading. The longitude of the viewing position may comprise a longitude of the center of the 2D plane subtracted by the distance along the heading. The distance between the viewing position and the center of the 2D plane may be given by $$\frac{H}{2} \cot\left(\frac{FOV}{2}\right),$$

where H is a height of the 2D plane and FOV is a field-of-view angle for viewing the billboard image from the viewing position (e.g., angle of field-of-view 312).

Returning to FIGS. 1, 2, 3, and 4, according to step S206, projection module 102 may determine final projection 408 of target 306 on viewport 412. Final projection 408 is associated with the final camera pose of camera 302. For example, when camera 302 assumes the final camera pose (e.g., at the final position and the final orientation), final projection 408 is formed on viewport 412.

With knowledge of the initial camera pose and the final camera pose, a plurality of intermediate camera poses between the initial camera pose and the final camera pose can be calculated. According to step S208, camera pose module 104 may calculate a plurality of intermediate camera poses of camera 302 along navigational path 310 between the initial camera pose and the final camera pose. Each of the plurality of intermediate camera poses comprises at least one of an intermediate position (e.g., positions 316 and 318 in FIG. 3) and an intermediate orientation. In some aspects, each of the plurality of intermediate positions of camera 302 may be used to determine a respective intermediate distance between camera 302 and target 306. In some aspects, each of the plurality of intermediate orientations of camera 302 may comprise at least one of an intermediate tilt angle of camera 302 and an intermediate heading angle of camera 302.

According to certain aspects, each of the plurality of intermediate camera poses is associated with a corresponding intermediate projection of target 306 on viewport 412. For example, when camera 302 assumes the intermediate camera pose at position 316 in FIG. 3, projection 404 of target 306 may form on viewport 412 in FIG. 4. Similarly, when camera 302 assumes the intermediate camera pose at position 318 in FIG. 3, projection 406 of target 306 may form on viewport 412 in FIG. 4.

To provide camera 302 with a swooping transition from the high-altitude position to the low-altitude position, the plurality of intermediate camera poses may be calculated under one or more constraints. For example, the plurality of intermediate camera poses may be calculated such that each subsequent one of the plurality of intermediate projections is closer to final projection 408 than is a previous one of the plurality of intermediate projections. As shown in FIG. 4, the intermediate camera pose after the initial camera pose (e.g., when camera 302 is in position 316) may be calculated such that intermediate projection 404 is closer to final projection 408 than is initial projection 402. Similarly, a subsequent intermediate camera pose (e.g., when camera 302 is in position 318) may be calculated such that intermediate projection 406 is closer to final projection 408 than is intermediate projection 404.

In addition to the foregoing constraint, the plurality of intermediate camera poses may be calculated such that the plurality of intermediate projections (e.g., intermediate projections 404 and 406) is aligned in a straight line 410 between initial projection 404 and final projection 408. Furthermore, the plurality of intermediate camera poses may be calculated such that each of the plurality of intermediate projections of target 406 remains on viewport 412 (e.g., target 306 remains within field-of-view 312 as camera 302 travels along navigational path 310). In some aspects, the plurality of intermediate camera poses is calculated such that each of the plurality of intermediate projections of a center of target 406 remains on viewport 412.

According to various aspects of the subject technology, in addition to interpolating the plurality of intermediate camera poses, the field-of-view of the camera (e.g., field-of-view 312) may be interpolated as well. For example, the initial projection (e.g., initial projection 402) and the initial camera pose may be associated with an initial FOV of the camera. Furthermore, the final projection (e.g., final projection 408) and the final camera pose may be associated with a final FOV of the camera. According to certain aspects, FOV module 106 may calculate a plurality of intermediate FOVs of the camera along the navigational path between the initial camera pose and the final camera pose (e.g., navigational path 310). Each of the plurality of intermediate FOVs may be associated with a corresponding intermediate projection of the target (e.g., target 306) on the viewport (e.g., 412). In some aspects, FOV module 106 may calculate the plurality of intermediate FOVs by linearly interpolating the plurality of intermediate FOVs between the initial FOV and the final FOV along the navigational path. For example, if the initial FOV is about zero degrees and the final FOV is about 50 degrees, FOV module 106 may calculate the plurality of intermediate FOVs such that the plurality of intermediate FOVs are linearly interpolated between zero degrees and 50 degrees.

Since the FOV of the camera may vary between the initial FOV and the final FOV, the projection of the target may vary in size relative to the viewport. According to certain aspects of the subject technology, in response to the FOV of the camera being varied (e.g., linearly), camera pose module 104 may determine the plurality of intermediate positions between the initial camera pose and the final camera pose such that inverses of the sizes of the projection of the target (e.g., initial projection 402, the plurality of intermediate projections such as projections 404 and 406, and final projection 408) may vary linearly as well. For example, initial projection 402 may be associated with an initial size, final projection 408 may be associated with a final size, and each of the plurality of intermediate projections such as projections 404 and 406 may be associated with an intermediate size. According to certain aspects, camera pose module 104 may determine the plurality of intermediate positions of camera 302 such that inverses of the plurality of intermediate sizes is linearly interpolated between an inverse of the initial size and an inverse of the final size.

The mathematical detail associated with the foregoing constraints in calculating the plurality of intermediate camera poses and the plurality of intermediate FOVs is presented as follows. Let the camera pose of camera 302 be defined by a 3×4 model-view matrix P=[R t], where R is the orientation of the camera and t is the translation of camera 302. The camera position may be given by $c=-R^{-1}t$. If it is assumed that camera 302 is not allowed to roll, then the rotation can be decomposed into the product of a tilt rotation $R_\alpha$ and a heading rotation $R_\beta$:

$$R = R_\alpha R_\beta \tag{1}$$

where, $$R_\alpha = \begin{bmatrix} 1 & 0 & 0 \\ 0 & \cos\alpha & -\sin\alpha \\ 0 & \sin\alpha & \cos\alpha \end{bmatrix} \tag{2}$$

$$R_\beta = \begin{bmatrix} \cos\beta & -\sin\beta & 0 \\ \sin\beta & \cos\beta & 0 \\ 0 & 0 & 1 \end{bmatrix} \tag{3}$$

Let $\Pi$ be the projection operator:

$$\Pi(x, y, z) \to (x/z, y/z), \tag{4}$$

and let o denote the 3D location of target 306. The set of camera matrices P(t), t ∈ [0,1], may be determined such that:

$$\Pi P(t)o = \begin{bmatrix} u(t) \\ v(t) \end{bmatrix}, \tag{5}$$

where $[u(t), v(t)]^T$ is the desired projection of target 306 at any given time. The choice of $[u(t), v(t)]^T$ may be user defined. However, as a user-defined choice, target 306 may be configured to project on a 2D line (e.g., line 410) joining initial projection 402 and final projection 408, and to monotonically get closer to final projection 408. A non-complex solution is to linearly interpolate between the initial projection 402 and the final projection 408:

$$\begin{bmatrix} u(t) \\ v(t) \end{bmatrix} = (1-t)\Pi P(0)o + t\Pi P(1)o \tag{6}$$

One approach for solving for the camera matrix is to interpolate the camera position using a 3D spline process. Then, once the camera position is known, the orientation of camera 302 can be found such that equation (5) is satisfied. Another approach for solving for the camera matrix is to first interpolate camera orientation, for example, by linearly interpolating the angles α and β, and then equation (5) can be use to determine the camera positions. Both of the foregoing approaches may be used to solve for the camera matrix. The former approach may involve solving a system of trigonometric equations using Grobner basis, while the latter approach may provide a simpler linear solution.

Given the camera orientation and the projection of target 306, a problem lies in computing the position of camera 302 that satisfies equation (5). To simplify this problem, the origin of the coordinate frame can be moved to o, i.e., $o=[0,0,0]^T$. Let $t(t)=[x(t), y(t), z(t)]^T$, which provides the following:

$$\Pi P(t)[0, 0, 0]^T = [x(t)/z(t), y(t)/z(t)]^T \tag{7}$$

The foregoing simplification may allow equation (5) to be rewritten as:

$$\begin{bmatrix} x(t)/z(t) \\ y(t)/z(t) \end{bmatrix} = \begin{bmatrix} u(t) \\ v(t) \end{bmatrix} \tag{8}$$

Note that for any solution (x(t), y(t), z(t)) that satisfies the foregoing equations, λ(x(t), y(t), z(t)) may also satisfy them. Thus, an additional constraint may be used to make the problem well posed. It can be assumed for now that a function λ(t) may constrain the norm of t(t). Then it can be seen that $$t(t) = \frac{\lambda(t)}{(u^2(t) + v^2(t) + 1)^{1/2}} [u(t), v(t), 1]^T \tag{9}$$

By moving the coordinate frame back to a global frame where o is not the origin, the following can be obtained:

$$t(t) = \frac{\lambda(t)}{(u^2(t) + v^2(t) + 1)^{1/2}} [u(t), v(t), 1]^T - R^{-1}(t)o \tag{10}$$

Next, the scaling function λ(t) can be specified, which can be defined as the interpolation:

$$\lambda(t) = \|c(t) - o\| = (1-t)\|c_0 - o\| + t\|c_1 - o\| = (1-t)\lambda(0) + t\lambda(1) \tag{11}$$

If the FOV of the camera is allowed to change, then the scaling function λ(t) may be modified because changing the FOV may introduce a change in the projected size of an object in a similar way as the scaling function λ(t). As a result, it is desirable to control the total amount of scaling from both the FOV and the scaling function λ(t). Let $$K = \begin{bmatrix} f & 0 & 0 \\ 0 & f & 0 \\ 0 & 0 & 1 \end{bmatrix} \quad (12)$$

be a simplified version of the intrinsics matrix, where f is the focal length of the camera in pixels. The overall scale change induced by the camera projection of a unit sphere located at the target may be $$d_{2d}(t) \sim \frac{f(t)}{\lambda(t)} d_{3d} \quad (13)$$

As a result, in order to obtain the same scaling across time as when the FOV did not change, the interpolation of f and λ may have to be related via equation (13). Let f(t) be the focal length at time t, and from equations (11) and (13), the following can be obtained:

$$\lambda(t) = f(t)\left((1-t)\frac{\lambda(0)}{f(0)} + t\frac{\lambda(1)}{f(1)}\right) \quad (14)$$

Method 200 may be used to navigate camera 302 along navigational path 310 as a transition from the initial camera pose to the final camera pose. In some aspects, the speed at which camera 302 is navigated along navigational path 310 may be optimized for the user's experience. Navigating camera 302 too quickly may result in an abrupt and unpleasant user experience. On the other hand, navigating camera 302 too slowly may be time consuming and delay the user from viewing target 306 at the streetview. According to certain aspects, camera 302 may be navigated along navigational path 302 in at least 0.4 seconds and at most 1 second. This time duration may provide the user with a pleasant transition between the initial camera pose and the final camera pose. Other time durations may be used depending on the distance between the initial camera pose and the final camera pose.

In some aspects, method 200 may be implemented by a client device (e.g., a desktop computer, a laptop computer, a tablet, a netbook, a mobile phone, etc.). For example, such a client device may be running a mapping application, and may comprise system 100. A user of the client device may use the mapping application to swoop from an aerial image of a target to a streetview image of the target. In some aspects, method 200 may be implemented by a server that can provide instructions and/or other information relevant to the swooping to the client device running the mapping application. For example, the server may comprise system 100 and may provide, over a network such as the Internet, the projections, camera poses, and other suitable information to the client device. In some aspects, method 200 may be implemented by both the server and the client device. For example, one or more steps of method 200 may be implemented by the client device while one or more other steps of method 200 may be implemented by the server.

Figure 6:
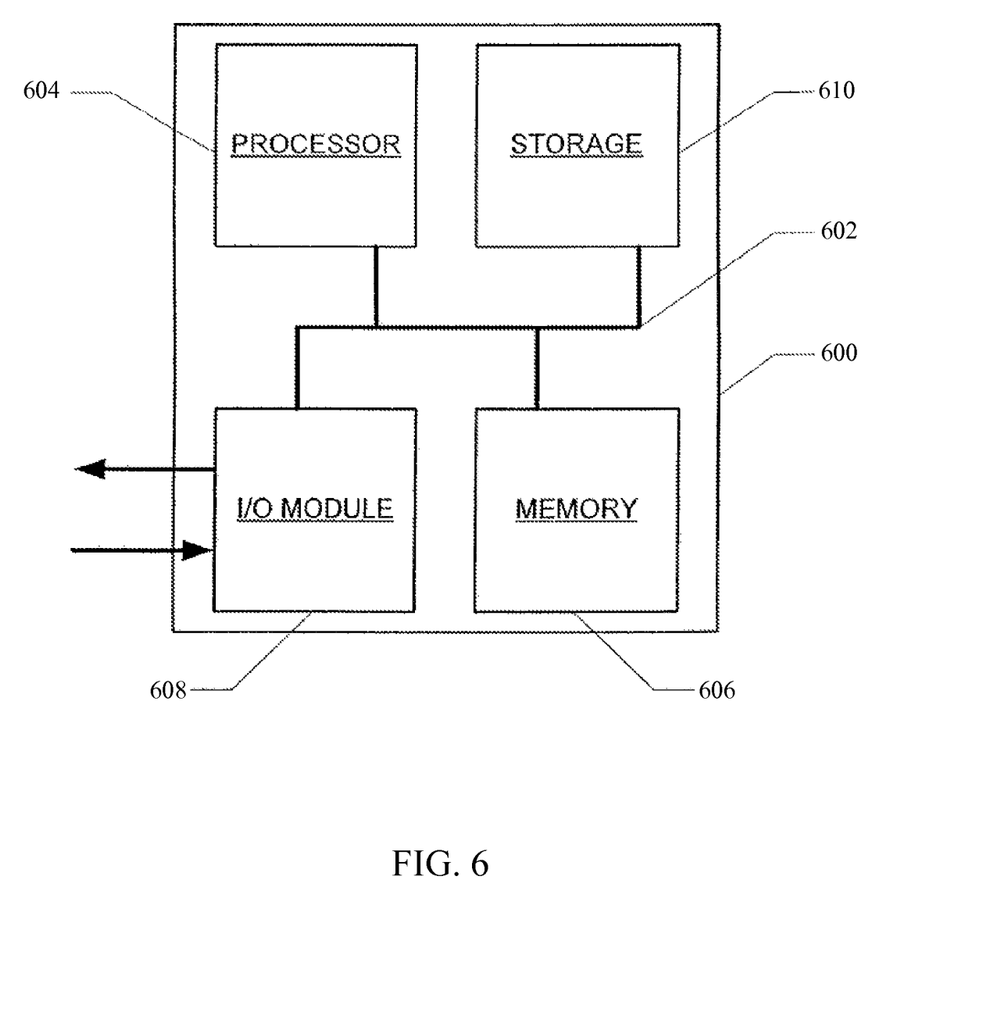
FIG. 6 is a block diagram illustrating components of a controller, in accordance with various aspects of the subject disclosure.

FIG. 6 is a block diagram illustrating components of controller 600, in accordance with various aspects of the subject disclosure. Controller 600 comprises processor module 604, storage module 610, input/output (I/O) module 608, memory module 606, and bus 602. Bus 602 may be any suitable communication mechanism for communicating information. Processor module 604, storage module 610, I/O module 608, and memory module 606 are coupled with bus 602 for communicating information between any of the modules of controller 600 and/or information between any module of controller 600 and a device external to controller 600. For example, information communicated between any of the modules of controller 600 may include instructions and/or data. In some aspects, bus 602 may be a universal serial bus. In some aspects, bus 302 may provide Ethernet connectivity.

In some aspects, processor module 604 may comprise one or more processors, where each processor may perform different functions or execute different instructions and/or processes. For example, one or more processors may execute instructions for operating system 100, one or more processors may execute instructions for navigating camera 302, and one or more processors may execute instructions for input/output functions.

Memory module 606 may be random access memory ("RAM") or other dynamic storage devices for storing information and instructions to be executed by processor module 604. Memory module 606 may also be used for storing temporary variables or other intermediate information during execution of instructions by processor 604. In some aspects, memory module 606 may comprise battery-powered static RAM, which stores information without requiring power to maintain the stored information. Storage module 610 may be a magnetic disk or optical disk and may also store information and instructions. In some aspects, storage module 610 may comprise hard disk storage or electronic memory storage (e.g., flash memory). In some aspects, memory module 606 and storage module 610 are both a machine-readable medium.

Controller 600 is coupled via I/O module 608 to a user interface for providing information to and receiving information from an operator of system 100. For example, the user interface may be a cathode ray tube ("CRT") or LCD monitor for displaying information to an operator. The user interface may also include, for example, a keyboard or a mouse coupled to controller 600 via I/O module 608 for communicating information and command selections to processor module 604.

According to various aspects of the subject disclosure, methods described herein are executed by controller 600. Specifically, processor module 604 executes one or more sequences of instructions contained in memory module 606 and/or storage module 610. In one example, instructions may be read into memory module 606 from another machine-readable medium, such as storage module 610. In another example, instructions may be read directly into memory module 606 from I/O module 608, for example from an operator of system 100 via the user interface. Execution of the sequences of instructions contained in memory module 606 and/or storage module 610 causes processor module 604 to perform methods to navigate a camera. For example, a computational algorithm for navigating a camera may be stored in memory module 606 and/or storage module 610 as one or more sequences of instructions. Information such as the initial camera pose, the final camera pose, the plurality of intermediate camera poses, the initial FOV, the final FOV, the plurality of intermediate FOVs, the initial projection, the final projection, the intermediate projections, panorama image 304, billboard image 308, target 306, line 410, and other suitable information may be communicated from processor module 604 to memory module 606 and/or storage module 610 via bus 602 for storage. In some aspects, the information may be communicated from processor module 604, memory module 606, and/or storage module 610 to I/O module 608 via bus 602. The information may then be communicated from I/O module 608 to an operator of system 100 via the user interface.

One or more processors in a multi-processing arrangement may also be employed to execute the sequences of instructions contained in memory module 606 and/or storage module 610. In some aspects, hard-wired circuitry may be used in place of or in combination with software instructions to implement various aspects of the subject disclosure. Thus, aspects of the subject disclosure are not limited to any specific combination of hardware circuitry and software.

The term "machine-readable medium," or "computer-readable medium," as used herein, refers to any medium that participates in providing instructions to processor module 604 for execution. Such a medium may take many forms, including, but not limited to, non-volatile media, and volatile media. Non-volatile media include, for example, optical or magnetic disks, such as storage module 610. Volatile media include dynamic memory, such as memory module 606. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A computer-implemented method for navigating a camera, the method comprising:
    identifying, using one or more computing devices, an initial projection of a target on a viewport of the camera, the initial projection being associated with an initial camera pose of the camera and an initial size of the target;
    determining, using the one or more computing devices, a final projection of the target on the viewport, the final projection being associated with a final camera pose of the camera and a final size of the target, the final camera pose corresponding to a final camera image at an altitude lower than an altitude of an initial camera image corresponding to the initial camera pose;
    calculating, using the one or more computing devices, a plurality of intermediate camera poses of the camera along a navigational path between the initial camera pose and the final camera pose; and
    determining, using the one or more computing devices, a plurality of intermediate projections of the target correlating to the plurality of intermediate camera poses, each of the plurality of intermediate projections being associated with an intermediate size of the target and the plurality of intermediate positions is determined such that inverses of the plurality of intermediate sizes is linearly interpolated between an inverse of the initial size of the target and an inverse of the final size of the target,
    wherein each subsequent one of the plurality of intermediate projections is closer to the final projection of the target than is a previous one of the plurality of intermediate projections.

2. The method of claim 1, further comprising determining the final camera pose of the camera based on the target, the final camera pose comprising at least one of a final position of the camera and a final orientation of the camera.

3. The method of claim 2, wherein the final camera image comprises a panorama image displaying the target, and wherein the final position is at a center of the panorama image.

4. The method of claim 3, wherein the panorama image is spherical, and wherein the final position is centered within the panorama image.

5. The method of claim 2, wherein determining the final camera pose comprises:
generating a billboard image displaying the target; and
determining the final position of the camera and the final orientation of the camera such that the viewport of the camera is aligned with the billboard image.

6. The method of claim 5, wherein the billboard image comprises a two-dimensional plane perpendicular to a ground plane.

7. The method of claim 5, further comprising removing the billboard image once the camera assumes the final camera pose.

8. The method of claim 5, wherein the final camera image comprises a panorama image displaying the target, and wherein the panorama image at least partially surrounds the billboard image.

9. The method of claim 5, wherein the billboard image is defined by a viewing position and a viewing orientation.

10. The method of claim 9, wherein determining the final position of the camera and the final orientation of the camera comprises matching the final position to the viewing position and matching the final orientation to the viewing orientation.

11. The method of claim 1, wherein each of the plurality of intermediate camera poses comprises at least one of an intermediate position of the camera and an intermediate orientation of the camera.

12. The method of claim 11, wherein calculating the plurality of intermediate camera poses comprises:
determining the plurality of intermediate orientations of the camera between the initial camera pose and the final camera pose; and
determining the plurality of intermediate positions between the initial camera pose and the final camera pose based on the plurality of intermediate orientations.

13. The method of claim 12, wherein determining the plurality of intermediate orientations comprises linearly interpolating the plurality of intermediate orientations between the initial camera pose and the final camera pose.

14. The method of claim 11, wherein calculating the plurality of intermediate camera poses comprises:
determining the plurality of intermediate positions of the camera between the initial camera pose and the final camera pose; and
determining the plurality of intermediate orientations between the initial camera pose and the final camera pose based on the plurality of intermediate positions.

15. The method of claim 14, wherein determining the plurality of intermediate positions comprises interpolating the plurality of intermediate positions between the initial camera pose and the final camera pose using a three-dimensional spline process.

16. The method of claim 1, wherein the initial projection and the initial camera pose are associated with an initial field-of-view (FOV) of the camera, wherein the final projection and the final camera pose are associated with a final FOV of the camera, and wherein the method further comprises calculating a plurality of intermediate FOVs of the camera along the navigational path between the initial camera pose and the final camera pose, each of the plurality of intermediate FOVs being associated with a corresponding intermediate projection of the target on the viewport.

17. The method of claim 16, wherein calculating the plurality of intermediate FOVs comprises linearly interpolating the plurality of intermediate FOVs between the initial FOV and the final FOV along the navigational path.

18. The method of claim 16, wherein each of the plurality of intermediate camera poses comprises an intermediate position of the camera, and wherein calculating the plurality of intermediate camera poses comprises determining the plurality of intermediate positions between the initial camera pose and the final camera pose based on the plurality of intermediate FOVs.

19. The method of claim 1, further comprising navigating the camera along the navigational path from the initial camera pose to the final camera pose in at least 0.4 seconds and at most 1 second.

20. The method of claim 1, wherein the plurality of intermediate projections is aligned in a straight line between the initial projection and the final projection.

21. The method of claim 1, wherein the plurality of intermediate camera poses is calculated such that each of the plurality of intermediate projections of a center of the target remains on the viewport.

22. The method of claim 1, wherein the target comprises a point of interest in a mapping application.

23. A system for navigating a camera, the system comprising:
a memory storing a plurality of projections; and
one or more processors coupled to the memory, the one or more processor being configured to:
identify an initial projection of a target on a viewport of the camera and to determine a final projection of the target on the viewport, the initial projection being associated with an initial camera pose of the camera and an initial size of the target, the final projection being associated with the final camera pose and a final size of the target, the final camera pose corresponding to a final camera image;
calculate a plurality of intermediate camera poses of the camera along a navigational path between the initial camera pose and the final camera pose; and
determine a plurality of intermediate projections of the target correlating to the plurality of intermediate camera poses, each of the plurality of intermediate projections being associated with an intermediate size of the target and the plurality of intermediate positions is determined such that inverses of the plurality of intermediate sizes is linearly interpolated between an inverse of the initial size of the target and an inverse of the final size of the target,
wherein each subsequent one of the plurality of intermediate projections is closer to the final projection than is a previous one of the plurality of intermediate projections.

24. The system of claim 23, wherein the initial projection and the initial camera pose are associated with an initial field-of-view (FOV) of the camera, wherein the final projection and the final camera pose are associated with a final FOV of the camera, and wherein the one or more processors are further configured to calculate a plurality of intermediate FOVs of the camera along the navigational path between the initial camera pose and the final camera pose, each of the plurality of intermediate FOVs being associated with a corresponding intermediate projection of the target on the viewport.

25. The system of claim 24, wherein each of the plurality of intermediate camera poses comprises an intermediate position of the camera, and wherein the one or more processors are further configured to determine the plurality of intermediate positions between the initial camera pose and the final camera pose based on the plurality of intermediate FOVs.

26. The system of claim 25, wherein the one or more processors are configured to determine the plurality of intermediate positions such that the initial projection, the plurality of intermediate projections, and the final projection remain substantially the same size in response to the plurality of intermediate FOVs.

27. A non-transitory machine-readable medium encoded with executable instructions for navigating a camera, the instructions comprising code for:
Identifying an initial projection of a target on a viewport of the camera, the initial projection being associated with an initial camera pose of the camera and an initial size of the target, the initial camera pose corresponding to an aerial image displaying the target;
determining, using the one or more processors, a final camera pose of the camera based on the target and a final size of the target, the final camera pose corresponding to a street-level panoramic image displaying the target;
determining a final projection of the target on the viewport, the final projection being associated with the final camera pose of the camera;
calculating a plurality of intermediate camera poses of the camera along a navigational path between the initial camera pose and the final camera pose; and
determining a plurality of intermediate projections of the target correlating to the plurality of intermediate camera poses, each of the plurality of intermediate projections being associated with an intermediate size of the target and the plurality of intermediate positions is determined such that inverses of the plurality of intermediate sizes is linearly interpolated between an inverse of the initial size of the target and an inverse of the final size of the target,
wherein each subsequent one of the plurality of intermediate projections is closer to the final projection than is a previous one of the plurality of intermediate projections, and
wherein the plurality of intermediate projections is aligned in a straight line between the initial projection and the final projection.

28. The non-transitory machine-readable medium of claim 27, wherein the initial projection and the initial camera pose are associated with an initial field-of-view (FOV) of the camera, wherein the final projection and the final camera pose are associated with a final FOV of the camera, and wherein the instructions further comprise code for calculating a plurality of intermediate FOVs of the camera along the navigational path between the initial camera pose and the final camera pose, each of the plurality of intermediate FOVs being associated with a corresponding intermediate projection of the target on the viewport.

29. The non-transitory machine-readable medium of claim 28, wherein calculating the plurality of intermediate FOVs comprises linearly interpolating the plurality of intermediate FOVs between the initial FOV and the final FOV along the navigational path.

\* \* \* \* \*